(12) United States Patent
Gaddam et al.

(10) Patent No.: US 10,194,019 B1
(45) Date of Patent: Jan. 29, 2019

(54) METHODS AND SYSTEMS FOR INITIATING A PHONE CALL FROM A WIRELESS COMMUNICATION DEVICE (71) Applicant: QUALCOMM Incorporated, San Diego, CA (US)

(72) Inventors: Varun Gaddam, Hyderabad (IN); Shaik Malin, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/829,491

(22) Filed: Dec. 1, 2017

(51) Int. Cl.
*H04M 3/02* (2006.01)
*H04M 1/2745* (2006.01)
*H04W 4/02* (2018.01)

(52) U.S. Cl.
CPC ........... *H04M 3/02* (2013.01); *H04M 1/2745* (2013.01); *H04W 4/027* (2013.01)

(58) Field of Classification Search
CPC .. G06F 2221/2111; G06F 21/41; G06F 21/53; G06F 2221/2149; G06F 9/543; G06F 2203/0339; G06F 3/0416; G06F 3/0488; G06F 3/017; G06F 3/04847; G06F 3/0487; G06F 21/606; H04L 67/10; H04L 63/0815
See application file for complete search history.

(56) References Cited

U.S. PATENT DOCUMENTS

| | | | | |
|---|---|---|---|---|
| 9,159,221 B1* | 10/2015 | Stantchev | ........... | G08C 17/02 |
| 2004/0169674 A1* | 9/2004 | Linjama | ........... | G06F 1/1626 |
| | | | | 715/702 |
| 2005/0259641 A1* | 11/2005 | Beninato | ........... | H04L 29/06 |
| | | | | 370/354 |
| 2006/0097983 A1* | 5/2006 | Haggman | ........... | G06F 1/1626 |
| | | | | 345/156 |
| 2010/0216509 A1* | 8/2010 | Riemer | ........... | H04M 1/72577 |
| | | | | 455/557 |
| 2011/0115606 A1* | 5/2011 | Fu | ........... | G06F 21/32 |
| | | | | 340/5.83 |
| 2014/0033140 A1* | 1/2014 | Zeng | ........... | G06F 3/0488 |
| | | | | 715/863 |
| 2014/0120894 A1* | 5/2014 | Lee | ........... | H04W 4/027 |
| | | | | 455/418 |
| 2015/0242036 A1* | 8/2015 | Heidari | ........... | G06F 1/1684 |
| | | | | 345/173 |
| 2016/0091965 A1* | 3/2016 | Wang | ........... | G06F 3/011 |
| | | | | 345/156 |
| 2016/0259459 A1* | 9/2016 | Yang | ........... | G06F 3/01 |
| 2016/0367202 A1* | 12/2016 | Carter | ........... | A61B 5/02 |

* cited by examiner

*Primary Examiner* — Nimesh Patel
(74) *Attorney, Agent, or Firm* — Patterson & Sheridan, L.L.P.

(57) ABSTRACT

Certain aspects of the present disclosure provide techniques for initiating a phone call from a wireless communication device based on physical interaction with the wireless communication device. In one example, a method for initiating a call from a wireless communication device, includes: receiving sensor data from a first sensor in the wireless communication device during a user interaction time interval; detecting a number of user interactions on the wireless communication device during the user interaction time interval based on the sensor data; determining a contact number associated with the number of user interactions; and causing the wireless communication device to dial the contact number at an end of the user interaction time interval.

20 Claims, 5 Drawing Sheets

METHODS AND SYSTEMS FOR INITIATING A PHONE CALL FROM A WIRELESS COMMUNICATION DEVICE

INTRODUCTION

Aspects of the present disclosure relate to wireless communication devices, such as smartphones, and more particularly, to techniques for initiating a phone call from a wireless communication device based on physical interaction with the wireless communication device.

Wireless communication devices, such as smartphones, are widely deployed to provide various services such as telephony, video, data, messaging, broadcasts, and others. While making phone calls is but one of the many uses of modern wireless devices, it remains an important and frequently used feature.

The basic method of making a phone call has remained more or less the same despite the advent of many modern technologies in wireless communication devices. For example, a user may launch a phone application on a wireless communication device, dial a number, and initiate a phone call by pressing an appropriate button. Alternatively, a user may search a contact list or directory for a saved phone number and initiate a phone call from the stored contact information. While the aforementioned methods are both known and reliable, they still require much user interaction with the wireless device. For example, the user may have to touch many user interface elements (e.g., icons, buttons, and virtual keys). In some cases, the sizes of the user interface elements are such that it requires focus and precision to interact with them correctly. Further, the user may have to navigate more than one application (e.g., a contact data application and a phone application) to initiate a call. In some situations, such as when a user is focused on other tasks (e.g., driving), the conventional methods of initiating a phone call from the wireless communication device are neither practical nor safe.

Accordingly, what is needed are new means for initiating phone calls from a wireless communication device that are easier and that leverage modern capabilities of the wireless communication device.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between participants in a wireless network.

A first aspect provides a method for initiating a call from a wireless communication device, including: receiving sensor data from a first sensor in the wireless communication device during a user interaction time interval; detecting a number of user interactions on the wireless communication device during the user interaction time interval based on the sensor data; determining a contact number associated with the number of user interactions; and causing the wireless communication device to dial the contact number at an end of the user interaction time interval. In some aspects, a non-transitory computer readable medium stores a program causing a wireless communication device to execute the method for initiating a call from a wireless communication device.

A second aspect provides a wireless communication device, including: a memory comprising executable instructions; a first sensor; a processor configured to execute the executable instructions and cause the wireless communication device to: receive sensor data from the first sensor during a user interaction time interval; detect a number of user interactions during the user interaction time interval based on the sensor data; determine a contact number associated with the number of user interactions; and cause the wireless communication device to dial the contact number at an end of the user interaction time interval.

To the accomplishment of the foregoing and related ends, the one or more aspects comprise the features hereinafter fully described and particularly pointed out in the claims. The following description and the related drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for initiating a phone call from a wireless communication device based on physical interaction with the wireless communication device.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

Example Methods and Apparatuses for Initiating a Phone Call from a Wireless Communication Device Conventional methods for initiating a phone call from a wireless communication device, such as a smartphone, may include launching a phone application on the wireless communication device, dialing a phone number using physical or virtual keys (e.g., on a touchscreen), and initiating the phone call with an appropriate button. In some instances, a user may need to search a contact list or directory for a saved phone number prior to initiating the phone call. For example, the user may not recall the phone number needed to initiate the call. This challenge may be particularly acute when the user is attempting to make an international call, which often requires dialing additional numbers (e.g., country codes) in a format that is different from a "home" format. A common aspect to conventional methods for initiating phone calls is the need for a variety of (and a lot of) user interaction with the wireless communication device.

A user's interaction with elements of a user interface may be further complicated when the user interface elements (e.g., virtual or physical buttons) are relatively small or otherwise require a relatively high level of precision to interact with. For example, despite many smartphones having relative large touchscreens, the buttons used to initiate phone calls, such as the keypad, are often quite small relative to the touchscreen. Further, the buttons may be placed within the graphical user interface, or physically on the smartphone, such that single-handed operation is difficult. Innate challenges of the user interface of smartphones may be exacerbated when a user is trying to initiate a phone call in certain contexts. For example, if a user is driving, the user cannot, or at least should not, divert attention away from driving to navigate the various user interface elements with precision. And when a user does not or cannot divert its attention so as to navigate the user interface precisely, the user may end up dialing the wrong number, etc.

Certain improvements to the conventional methods for initiating a phone call from a wireless communication device exist. For example, "speed dial" may allow a user to dial a number without typing the entire number into the wireless communication device. And voice dialing may allow a user to dial a number without dialing any numbers at all. But even these improved methods generally require a high level of interaction with the wireless communication device. For example, in the case of speed dial, a user must generally still unlock the wireless communication device, select an appropriate application, an key in a truncated number or press an appropriate user interface element (e.g., button or icon) to initiate the call. In the case of voice dialing, a user may need to unlock the phone and press a button to activate the voice call application. And where a user's voice is used to initiate a call, the user's environment becomes an issue because voice recognition may be significantly affected by environmental factors, such as ambient noise, wind, etc. Further, voice dialing generally requires an internet connection because in many cases the "voice assistant" is hosted by a remote server. Accordingly, these methods may not actually reduce the level of interaction or ease the process of initiate a phone call in most cases.

Modern wireless communication devices include a range of sensors that may be used in novel ways to allow a user to initiate a phone call. For example, modern wireless communication devices may include a range of sensors, such as accelerometers, gyroscopes, magnetometers, proximity sensors, ambient light sensors, image sensors, microphones, and others. Many of these sensors may provide feedback to the wireless communication device, e.g., in the form of analog or digital data, that may be interpreted as a user interaction with the wireless communication device. A benefit of relying on sensors onboard the wireless communication device is that the applications utilizing the sensor data are hosted locally and therefore do not requires a network connection unlike, for example, remotely-hosted voice assistants.

For example, a wireless communication device may include one or more acceleration sensors, such as accelerometers, that measure motion of the wireless communication device relative to one or more axes. The accelerometers may be in the form of, for example, microelectromechanical system (MEMS) sensors. In some cases, an accelerometer may be able to measure acceleration in multiple axes at once, such as a two- or three-axis motion sensor. The accelerometers may detect a user interacting with the wireless communication device, such as a user tapping on the wireless communication device, because the tap on the wireless communication device will be detected as a short acceleration in one or more axes. Notably, in this case, the taps detected by the accelerometer are distinct from taps recognized by a touchscreen, which may be referred to as touchscreen inputs, though the two types of taps may be used together to the same end. In fact, taps on the touchscreen while the touchscreen is not activated (i.e., asleep) may be detected by accelerometers even when the touchscreen itself does not detect the user interactions (e.g., by way of capacitive or resistive touch sensors). Additionally, taps on other parts of the wireless communication device may be detected, such as taps on the backside of the wireless communication device (i.e., on the side opposite the main or touchscreen display).

Modern wireless communication devices may also include special processors or chips that measure motion and/or orientation data without the need to have a main processor (or main processors) active. In this way, the wireless communication device may be able to continue to receive and process motion and/or orientation data without the wireless communication device being "awake." Such processors may allow for increased functionality with a relatively minimal impact on battery life as compared to using the primary processor(s) to detect user interactions with the wireless device.

In other examples, other sensors data may be used to determine user interactions with the wireless communication device. For example, a microphone may "listen" for taps on the wireless communication device. Or a gyroscope may detect small changes in orientation when a user taps on the wireless communication device. Or an ambient light or image sensor may detect the sensor being purposefully obscured, for example, by a user tapping on top of the sensor.

A wireless communication device's ability to recognize user interactions, such as taps, and initiate a phone call thereby may offer many advantages to conventional methods. First, a user may not need to have a complex or long interaction with the wireless communication device to initiate a phone call. For example, the user may not need to unlock the wireless communication device, select an appropriate application, look up contact information, and then initiate a phone call by yet further button presses. Instead, the user may simply tap on the phone a predetermined number of times and thereby cause the wireless communication device to dial a number associated with the number of taps; i.e., the user may simply tap-to-call. The tap-to-call method enables a user to initiate a phone call more easily and safely in a wider variety of situations. For example, a user may initiate a phone call while driving by simply tapping on the wireless communication device rather than diverting its attention to the conventional process of initiating a phone call. Further, the tap-to-call method will work without activating a display of the wireless communication device (and the associated processors) so it may be a more power efficient method of initiating a phone call. Further yet, the tap-to-call method may allow a user to initiate a phone call despite damage to the wireless communication device, such as damage to a touchscreen that renders the touchscreen inoperable to receive touch input.

Figure 1:
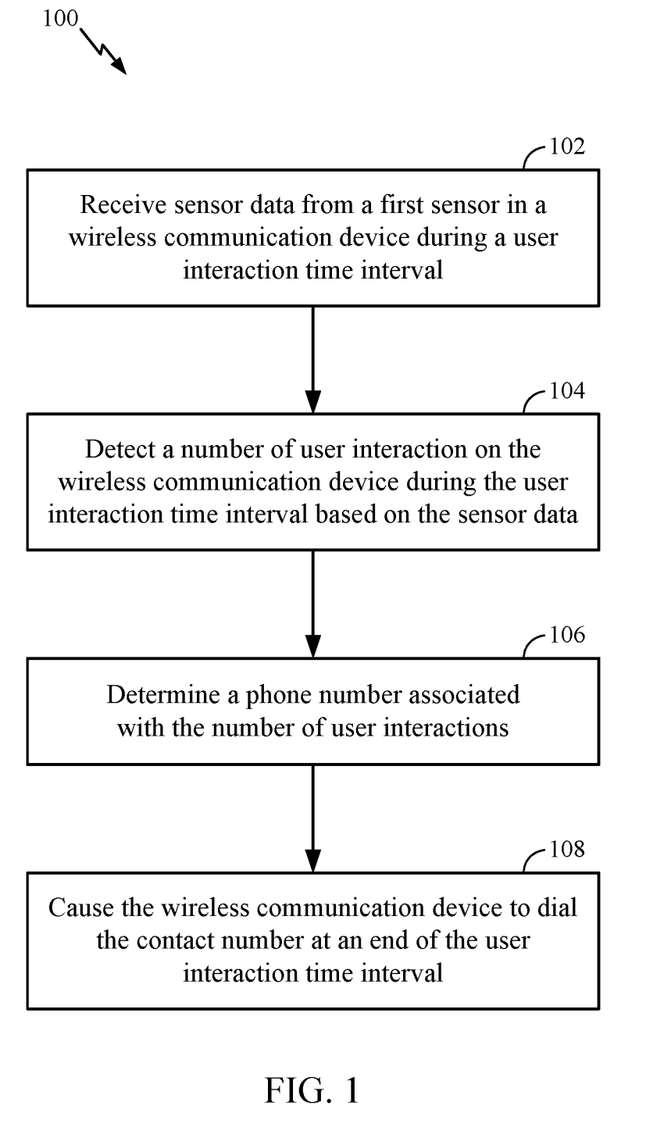
FIG. 1 depicts an example of a method for initiating a call in accordance with aspects of the present disclosure.

FIG. 1 depicts a method 100 for initiating a phone call from a wireless communication device. The method 100 begins at step 102 where a wireless communication device receives sensor data from a first sensor in the wireless communication device during a user interaction time interval. For example, the wireless communication device may receive acceleration data from an onboard sensor, such as an accelerometer. In some examples, the accelerometer may be a MEMS-based accelerometer.

In some examples, the sensor data may be multi-axis sensor data, such as multi-axis acceleration data. The multi-axis sensor data may include scalar data streams for different axes, such as the 'X', 'Y', and 'Z' axes or it may include vector data having a direction, such as a net acceleration vector.

In some cases the direction of the acceleration data may be compared to an orientation of the phone to help determine whether the sensed acceleration is a user interaction (e.g., tap) from a user or another kind of acceleration, such as an environmental acceleration. For example, a direction of the acceleration may be compared to a reference axis emanating from and orthogonal to a plane of the phone in order to determine an angle of the acceleration relative to the reference axis. In some examples, the angle of the acceleration relative to the reference axis may be used to determine whether the acceleration is a user interaction (e.g., tap) or not. For example, the angle of the acceleration relative to the reference axis may be compared to a threshold, above which a user interaction is determined, and below which no user interaction is determined.

For example, if a wireless communication device, such as a smartphone, were travelling in a car, it may be subject to environmental accelerations that are not user interactions (e.g., taps) by a user. Similarly, if a wireless communication device is in a user's pocket while the user moves about, it may be subject to environmental accelerations that are likewise not user interactions by the user. Accordingly, comparing the direction of the acceleration relative to the orientation of the phone may improve the ability to distinguish user interactions (e.g., taps) from environmental accelerations.

In some examples, acceleration data from only one axis of a multi-axis acceleration may be used for purposes of determining user interactions, such as taps. For example, a three-axis accelerometer may only output (or a function of the wireless communication device may only choose to receive) acceleration data along an axis that is orthogonal to a plane of the wireless communication device, such as the plane parallel to the display of the wireless communication device. Alternatively, acceleration data from axes other than the axis that is orthogonal to a plane of the phone may be ignored or filtered out. Similarly, an acceleration vector comprising components from multiple axes may be decomposed into orthogonal component vectors and the component vectors not orthogonal to the plane of the wireless communication device may be ignored.

In some examples, the wireless communication device may include multiple acceleration sensors, and data from one or more acceleration sensors may be used to determine a user interaction with the phone, such as a tap. For example, where two acceleration sensors are placed at opposite ends of a wireless communication device, the outputs of the two sensors may be compared to determine a user interaction (e.g., tap). In some cases, a disparity in the two acceleration sensors may increase the likelihood that a user interaction has taken place as compared to where the two acceleration sensors read near identical acceleration values. This is because a user interaction may be localized nearer to one sensor than the other and therefore one sensor may read a higher value compared to the other. By contrast, when an environmental acceleration affects the wireless communication device, such as when the wireless communication device is being moved about, the two acceleration sensors would be expected to read more similarly.

A user interaction time interval may be a period of time in which a number of user interactions (e.g., taps) is detected. The user interaction time interval may be, for example, 0.25 seconds, 0.5 seconds, 0.75 seconds, 1 second, or other intervals defined as necessary. The user interaction time interval may be referred to as a tap time interval when the user interaction is a tap on the wireless communication device.

The user interaction time interval may be initiated when a first user interaction (e.g., a first tap) is detected on the wireless communication device. In other examples, the user interaction time interval may repeat at fixed intervals.

The method 100 then moves to step 104, where a number of user interactions on the wireless communication device are detected during the user interaction time interval based on the sensor data. For example, after a first user interaction (e.g., tap) is detected, sensor data, such as acceleration data, may be analyzed to determine how many additional user interactions occur during the remainder of the user interaction time interval.

In some examples, determining the number of user interactions includes comparing the sensor data to predefined thresholds. For example, the magnitude of the sensor data may be considered in order to determine whether a user interaction occurred. As another example, the direction of the sensor data (e.g., an acceleration vector) may be compared to a reference axis in order to determine whether a user interaction occurred. In some cases, several potential user interactions during a user interaction time interval may result in only a subset of the potential user interactions being counted for purposes of the following steps.

In some examples, determining the number of user interactions includes disambiguating other types of user interactions with the wireless communication device. For example, if a user is tapping on a touchscreen to interact with an application on the wireless communication device, then those taps would need to be ignored for purposes of step 104 because those taps would not be for the purpose of initiating a phone call. In some cases, user interactions for purposes of initiating a phone call may be ignored based on the state of the wireless communication device. For example, if a touchscreen display is active, the tap-to-call functionality may be disabled. By contrast, if a user taps on the touchscreen when no application was active, for example when the wireless communication device was in a sleeping or standby state, then those taps may be counted.

Because both an accelerometer and sensors in the touchscreen may detect a user interaction simultaneously, or nearly simultaneously, the wireless device may need to disambiguate the concurrent user interactions and determine that only one user interaction has actually taken place. For example, the wireless communication device may detect a first user interaction from a first sensor in the wireless communication device, which may begin a disambiguation time interval. The first sensor may be an acceleration sensor. Thereafter, the wireless communication device may detect a second user interaction from a second sensor in the wireless communication device within the disambiguation time interval. The second sensor may be a touchscreen display sensor, such as a capacitive or resistive touchscreen. If the second user interaction is within the disambiguation time interval, the wireless communication device may ignore one of the first or the second user interactions because the wireless device knows that one user interaction caused both sensor readings (i.e., of the accelerometer and the touchscreen display).

In some examples, there may be a maximum number of user interactions counted during a user interaction time interval. For example, the wireless device may ignore any user interactions over the maximum number of user interactions. In some examples, the maximum number of user interactions during a user interaction time interval may be 5, 6, 7, 8, 9, or 10 user interactions (e.g., taps).

The method 100 then moves to step 106 where a phone number associated with the number of user interactions is retrieved. For example, where four user interactions (e.g., taps) are detected during a user interaction time interval, a phone number associated with that number of user interactions may be retrieved.

In some examples the association between numbers of user interactions detected and phone numbers may be stored in a phone application on a wireless communication device, or alternatively, in a contact application of the wireless communication device. In some examples, one application may access a phone number associated with a number of user interactions via an Application Programming Interface (API) between two or more applications. In some examples, the pairings of numbers of user interactions and phone numbers may be stored in a lookup table, or a database, or other data storage structure stored in a memory of the wireless communication device.

Though not shown in FIG. 1, in some examples a particular number of user interactions, or exceeding a number of user interactions, may be associated with an action instead of a contact number. For example, ten or more user interactions (e.g., taps) during a user interaction time interval may cause the wireless communication device to reset the user interaction time interval and not to determine a phone number associated with the number of user interactions. This may be provided in order for the user to have a way to avoid initiating a phone call to the wrong phone number if, for example, the user is aware that it has tapped the phone too many times for the intended contact.

The method 100 then moves to step 108 where the wireless communication device initiates a phone call by dialing the contact number at an end of the user interaction time interval. For example, where a phone application of the wireless communication device determines a contact number associated with the number of user interactions (as above), the phone application may thereafter cause a phone call to be initiated (i.e., dialed). In other examples, where an application separate from the phone application determines the number of user interactions, that separate application may send a message to the phone application, or interact with the phone application through an API, in order to cause the wireless communication device to dial the number.

In some examples, the wireless communication device may include a user interface for assigning numbers of detected user interaction events to contact data. For example, a phone application on the wireless communication device may allow a user to assign a phone number to two taps, another phone number to three taps, yet another phone number to four taps, and so on. Alternatively, a contact application on the wireless communication device may allow a user to associate a number of user interactions with contact data stored within the application. Either way, when a particular number of user interactions are detected, the wireless device may initiate a phone call to a particular phone number associated with that number of user interactions (e.g., taps). In some examples, the user interface for assigning numbers of detected user interaction events to contact data may also have an option to enable or disable the user-interaction-based phone call initiation feature (i.e., tap-to-call).

Notably, the example above describes a method of dialing a phone call based on determining a number of user interactions occurring during a user interaction time interval. In other examples, the wireless device may initiate other types of messaging based on the number of user interactions occurring during the user interaction time interval, such as sending a pre-determined email or text message.

Further, the example above describes the method of dialing a phone call with respect to receiving user interactions via the wireless communication device. In alternative examples, the user interactions may be received by a remote device, such as a smart watch or tablet computer, which is linked to the wireless communication device (e.g., smartphone) by a data connection, such as Bluetooth. For example, a user may tap on a smart watch that includes sensors, such as acceleration sensors, and the data and/or determined taps may be transmitted to a paired smartphone to initiate a phone call. In some cases, the smart watch may initiate the phone call through an API to a phone application on the smartphone. In yet other cases, the smart watch may initiate the call itself, such as where the smart watch includes connection capability to a phone network, such a cellular network. Thus, while the example described with respect to FIG. 1 recites a wireless communication device such as a smartphone, the principles of the method may be equally applied to any sort of wireless communication device (e.g., smart watch, tablet computer, etc.) having the capability to detect user interactions and to initiate a phone call.

Figure 2:
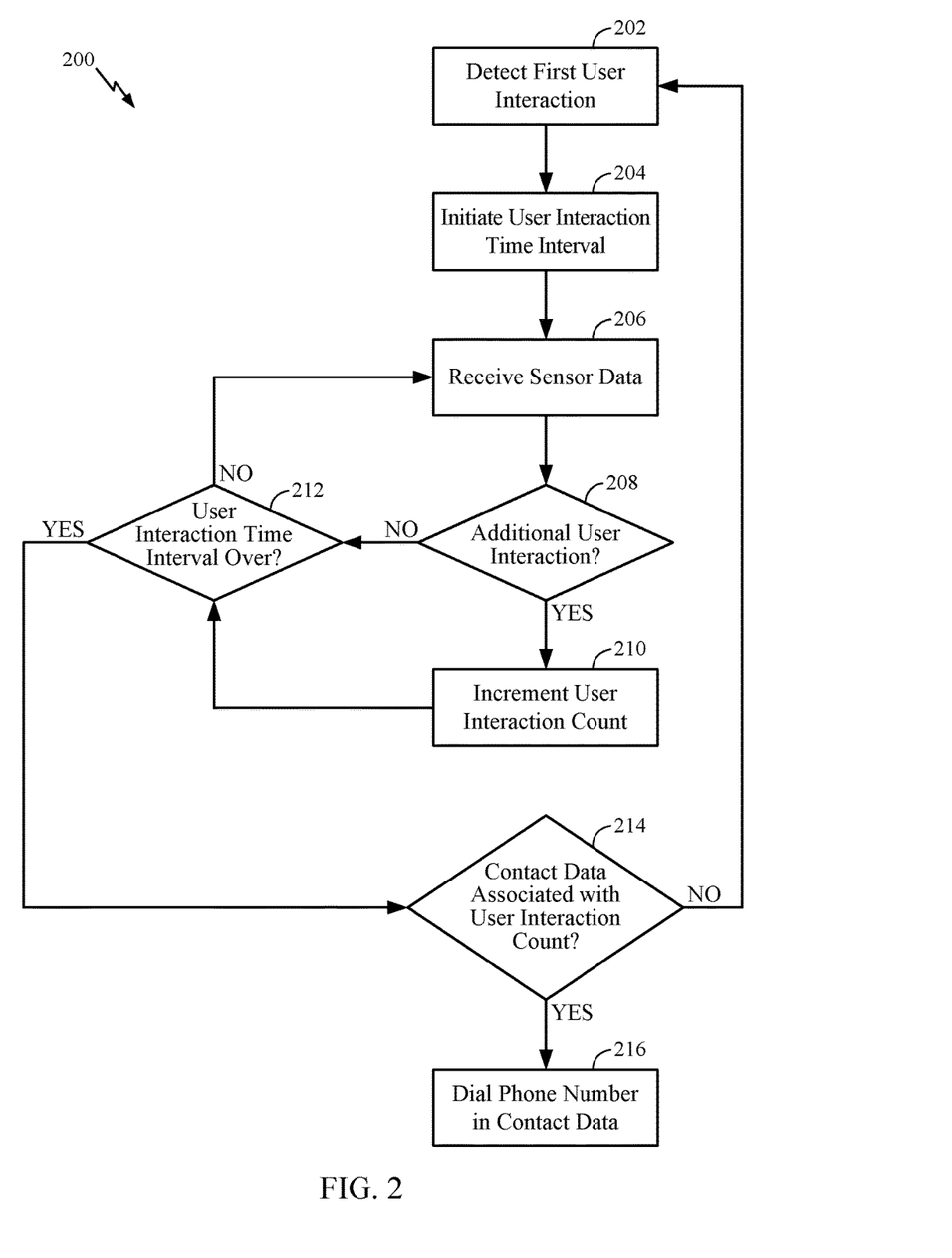
FIG. 2 depicts an example of a flow chart for initiating a call from a wireless communication device in accordance with aspects of the present disclosure.

FIG. 2 depicts aspects of a process flow 200 for initiating a phone call from a wireless communication device. The process 200 starts at step 202 where a wireless communication device detects a first user interaction. For example, the wireless communication device may detect a first user tap on the wireless communication device using acceleration data received from an acceleration sensor onboard the wireless communication device.

In some examples, the wireless communication device must be in a particular state or configuration before detecting a first user interaction. For example, the wireless communication device may need to be in a sleeping or standby state or may need to have its display off. In this way, user input, such as touchscreen user input, is not mistaken for user interaction data meant to initiate a phone call.

The process 200 then moves to step 204 where a user interaction time interval is initiated. The user interaction time interval may be, for example, in a range of between 0.1 seconds and 1 second. In some examples, the user interaction time interval may be about or exactly 0.5 seconds.

The process 200 then moves to step 206 where the wireless communication device receives additional sensor data. For example, the wireless device may receive additional acceleration data from an onboard acceleration sensor. As above, in some cases the wireless communication device may only receive a subset of the received acceleration data, such as acceleration along an axis orthogonal to the plane of the display.

The process 200 then moves to step 208 where it is determined whether the additional sensor data is representative of a user interaction, such as a tap on the wireless communication device. For example, the wireless communication device may determine a magnitude of the sensor data and compare it to a threshold.

In some examples, the wireless communication device may filter or otherwise ignore certain types of sensor data during the user interaction time interval. For example, if the wireless communication device is not in a sleeping or standby state (i.e., the display is on), the wireless device may ignore touchscreen input and only analyze acceleration data from an onboard acceleration sensor. In some examples, the user may only be able to tap on portions of the wireless communication device other than the display in order to initiate a phone call. As another example, if the wireless communication device is in a sleeping or standby state (i.e., the display is off), the wireless device may accept touchscreen input as potential user interaction data. For example, the user may be able to tap any part of the wireless communication device (e.g., including front, back, sides, and on display) in order to initiate a phone call.

If at step 208, the additional sensor data is determined to be a user interaction with the wireless communication device, such as a tap, then the process 200 moves to step 210 where the user interaction count is incremented. For example, the user interaction count may be incremented from one (representative of the first user interaction in step 202) to two (based on the additional sensor data received during the user interaction time interval).

After step 210, or after determining at step 208 that addition sensor data is not representative of a user interaction, the process 200 moves to step 212 where it is determined whether the user interaction time interval is over.

If at step 210 it is determined that the user interaction time interval is not over (e.g., less than 0.5 seconds has elapsed since initiating the user interaction time interval at step 204), then the process 200 returns to step 206 to receive more sensor data.

If at step 210 it is determined that the user interaction time interval is over (e.g., more than 0.5 seconds has elapsed since initiating the user interaction time interval at step 204), then the process 200 moves to step 214 where the wireless communication device determines whether there is contact data associated with the number of user interactions detected during the user interaction time interval.

If at step 214, there is contact data (e.g., including a phone number) associated with the number of user interactions detected during the user interaction time interval, then the process 200 moves to step 216 where the wireless communication device initiates a phone call based on the contact data. If at step 214, there is no contact data, then the process returns to step 202 to await another new user interaction.

Figure 3A:
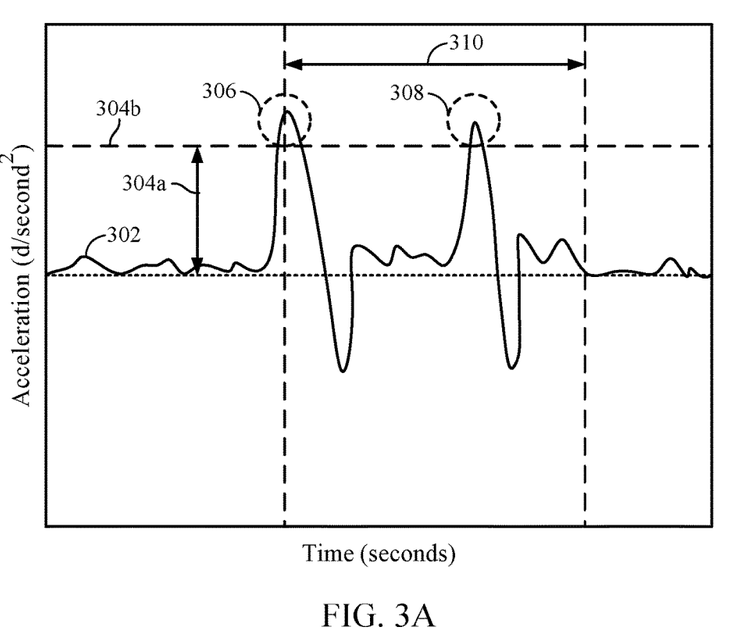
FIG. 3A depicts an example of sensor data related to user interactions with a wireless communication device.

FIG. 3A depicts an example of sensor data related to user interactions with a wireless communication device. In the depicted example, sensor data 302 is acceleration data plotted against time on the horizontal axis and acceleration on the vertical axis. Further, in this example, sensor data 302 may represent acceleration along an axis orthogonal to (i.e., emanating from) the display of the wireless communication device.

Broken line 304b indicates a threshold of magnitude 304a. Thus, any sensor data 302 that exceeds the threshold 304b may be determined to be a user interaction. For example, sensor data 302 exceeds threshold 304b at spots 306 and 308 and thus in this case both spots 306 and 308 are determined to be user interactions with the wireless communication device, such as taps on the wireless communication device.

Arrow 310 represents a length of a user interaction time interval. As depicted, the user interaction time interval begins with the first detected user interaction at spot 306 and then extends beyond the second detected user interaction at spot 308. Any additional user interactions beyond the user interaction time interval 310 would not be counted towards number of user interactions within time interval 310.

Figure 3B:
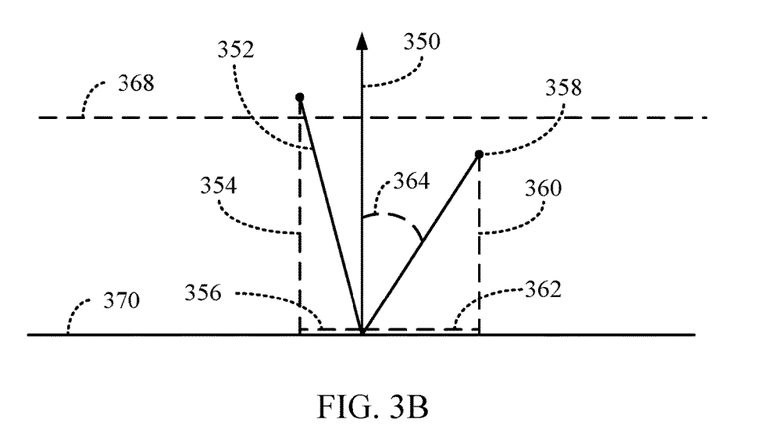
FIG. 3B depict an example of vector sensor data related to user interactions with a wireless communication device.

FIG. 3B depict an example of vector sensor data related to user interactions with a wireless communication device. In particular, vectors 352 and 358 represent acceleration data vectors plotted with reference to vertical axis 350 and horizontal axis 370, which is orthogonal to vertical axis 350. In this example, axis 370 is parallel to the display of the wireless communication device.

Vector 352 may be decomposed into vector elements 354, representing the acceleration along axis 350, and 356, representing the acceleration along axis 370. In this case, the wireless communication device may ignore vector element 356 and only determine whether vector element 354 exceeds threshold 368. In this case it does, so acceleration vector 352 may be determined to be a user interaction, such as a tap on the wireless communication device.

Similarly, vector 358 may be decomposed into vector elements 360, representing the acceleration along axis 350, and 362, representing the acceleration along axis 370. In this case, the wireless communication device may ignore vector element 362 and only determine whether vector element 360 exceeds threshold 368. In this case it does not, so acceleration vector 358 may be determined to not be a user interaction.

Angle 364 indicates a relative similarity of the direction of acceleration vector 358 relative to vertical axis 350. In some examples, the angle of the acceleration relative to the reference axis may be used to help determine whether the acceleration is a user interaction (e.g., tap or not a tap). For example, where a vector (not shown) exceeds threshold 368, but has an angle with respect to vertical axis 350 that is above a threshold (e.g., measured in degrees), it may nevertheless not be considered a user interaction. In such cases, the primary vector element is in a direction other than the vertical axis 350. Thus, an angle measure with respect to a reference axis may prevent a significant acceleration that is not a user interaction from being mistakenly determined as a user interaction based on threshold 368 alone.

Figure 4:
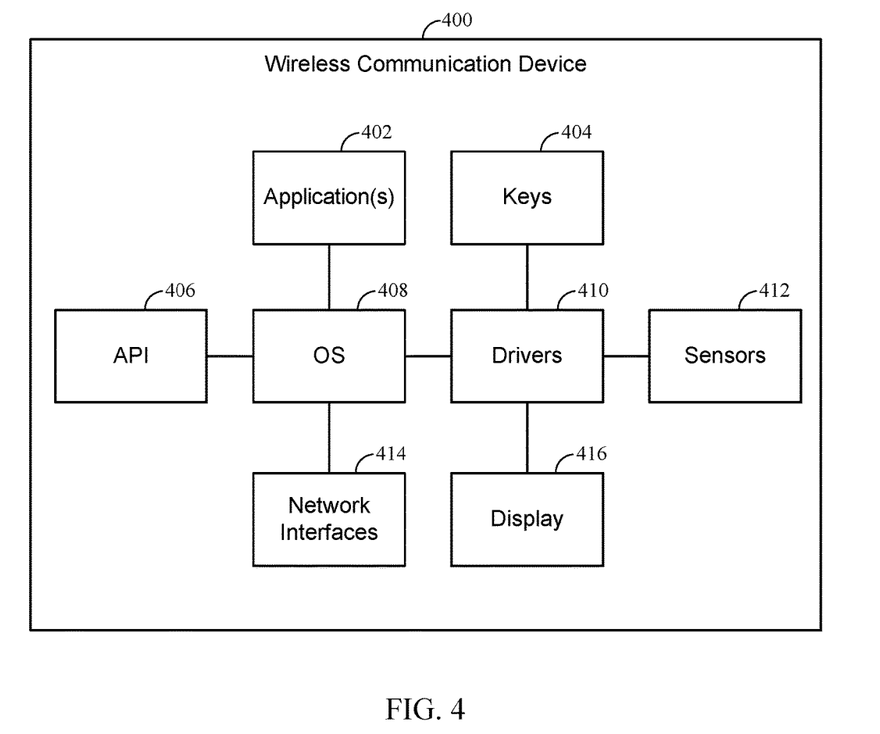
FIG. 4 depicts aspects of a wireless communications device in accordance with aspects of the present disclosure.

FIG. 4 depicts aspects of an example wireless communication device in which aspects of the present disclosure may be performed. In particular, FIG. 4 illustrates hardware and software components of a wireless communication device 400, such as a smartphone or other wireless device.

Wireless communication device 400 may perform functions in accordance with an one or more application 402. Applications 402 may provide the call initiation functions described herein, such as tap-to-call. For example, applications 402 may include a phone application or a contact application on a wireless communication device.

In some examples, applications 402 may communicate with the operating system (OS) 408 through an application programming interface (API) 406. Generally, an API 406 is an interface that defines the ways in which an application, such as application 402, may request services from an operating system, such as OS 408. In some examples, the call initiation functions described herein (e.g. tap-to-call) may be implemented in one or more APIs.

A user may generally interact with applications through the device display 416, which may be a touchscreen display, and physical keys 404. For example, users may depress a key 404 or touch the touchscreen 416 to interact with applications 402. Data received by way of keys 404 and touchscreen 416 may be shared with operating system 408 via drivers 410. Drivers 410 may act like translators between keys 404 and touchscreen 418 and OS 408.

Applications 402 may provide information and user interface elements to the user on display 416. For example, Applications 402 may display a user interface on display 416 for assigning numbers of detected user interaction events to contact data and for enabling or disabling the user-interaction-based phone call initiation feature (e.g., tap-to-dial).

Wireless communication device 400 may also include sensors 412. For example, wireless communication device 400 may include a range of sensors, such as accelerometers, gyroscopes, magnetometers, proximity sensors, ambient light sensors, image sensors, microphones, and others. Sensors 412 may provide sensor data that may be interpreted as a user interaction by an application 402 and/or through an API 406, such as described with respect to FIGS. 1, 2, 3A and 3B.

Wireless communication device 400 may also include a network interface 416, which may be used for placing phone calls. For example, network interface 416 may include a cellular network interface for cellular phone calls as well as a local area network or wide area network interface for placing voice-over-IP (VoIP) calls.

Figure 5:
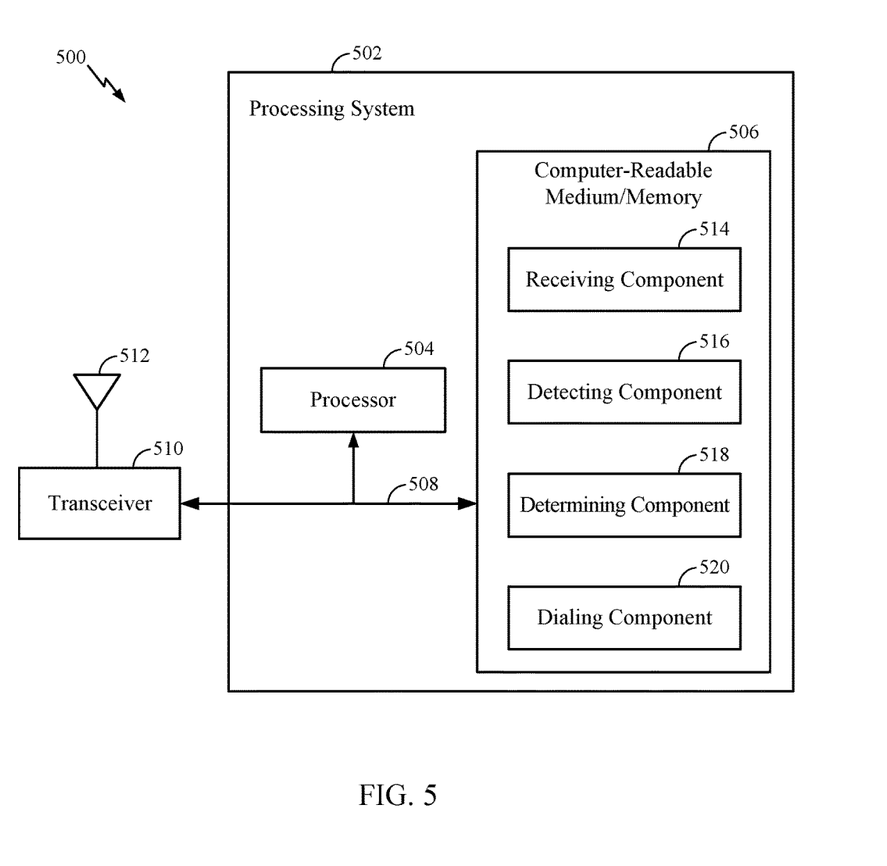
FIG. 5 depicts additional aspects of a wireless communications device in accordance with aspects of the present disclosure.

FIG. 5 depicts additional aspects of a wireless communications device 500 that includes various components (e.g., corresponding to means-plus-function components) configured to perform operations for the methods disclosed herein, such as the methods illustrated in FIGS. 1, 2, 3A and 3B. The communications device 500 includes a processing system 502 coupled to a transceiver 510. The transceiver 510 is configured to transmit and receive signals for the communications device 500 via an antenna 512, such as signals related to a call placed from communication device 500. The processing system 502 may be configured to perform processing functions for the communications device 500, including processing signals received and/or to be transmitted by the communications device 500.

The processing system 502 includes a processor 504 coupled to a computer-readable medium/memory 506 via a bus 508. In certain aspects, the computer-readable medium/memory 506 is configured to store instructions that when executed by processor 504, cause the processor 504 to perform the operations illustrated in FIGS. 1, 2, 3A and 3B, or other operations for performing the various techniques discussed herein.

In certain aspects, the processing system 502 further includes a receiving component 514, a detecting component 516, a determining component 518, and a dialing component 520 for performing the operations illustrated in FIGS. 1, 2, 3A and 3B. In some examples, the receiving component 514, detecting component 516, determining component 518, and dialing component 520 may be stored in a computer readable medium (e.g., memory) 506 and coupled to the processor 504 via bus 508. Thus, the receiving component 514, detecting component 516, determining component 518, and dialing component 520 may be software components that are executed and run on processor 504. In other examples, the receiving component 514, detecting component 516, determining component 518, and dialing component 520 may be hardware circuits.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a wireless communication device, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 1, 2, 3A and 3B.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for initiating a call from a wireless communication device, comprising:
   receiving sensor data from a first sensor in the wireless communication device during a user interaction time interval;
   detecting a plurality of user interactions on the wireless communication device during the user interaction time interval based on the sensor data;
   for each respective user interaction of the plurality of user interactions:
      determining a magnitude of the respective user interaction; and
      incrementing a number of user interactions if the magnitude of the respective user interaction is greater than a threshold;
   determining a contact number associated with the number of user interactions by:
      querying a contact repository based on at least the number of user interactions; and
      receiving the contact number associated with the number of user interactions; and
   causing the wireless communication device to dial the contact number at an end of the user interaction time interval.

2. The method of claim 1, further comprising: initiating the user interaction time interval upon detecting a first user interaction of the plurality of user interactions.

3. The method of claim 1, further comprising:
   detecting a first user interaction of the plurality of user interactions from the first sensor in the wireless communication device within a disambiguation time interval;
   detecting a second user interaction of the plurality of user interactions from a second sensor in the wireless communication device within the disambiguation time interval; and
   ignoring one of the first user interaction or the second user interaction.

4. The method of claim 1, wherein the first sensor in the wireless communication device is an accelerometer.

5. The method of claim 1, wherein the contact repository comprises a plurality of contacts, wherein one or more of the plurality of contacts is associated with a unique number of user interactions, and wherein no contact of the plurality of contacts is associated with the same number of user interactions as any other contact of the plurality of contacts.

6. The method of claim 1, wherein causing the wireless communication device to dial the contact number at an end of the user interaction time interval comprises:
   sending the contact number to a phone application of the wireless communication device; and
   sending an indication to the phone application to dial the contact number.

7. The method of claim 1, wherein the wireless communication device is in a locked state during the user interaction time interval.

8. The method of claim 1, wherein the wireless communication device is a smartphone.

9. A wireless communication device, comprising:
   a memory comprising executable instructions;
   a first sensor;
   a processor configured to execute the executable instructions and cause the wireless communication device to:
      receive sensor data from the first sensor during a user interaction time interval;
      detect a plurality of user interactions during the user interaction time interval based on the sensor data;
      for each respective user interaction of the plurality of user interactions:
         determine a magnitude of the respective user interaction; and
         increment a number of user interactions if the magnitude of the respective user interaction is greater than a threshold;
      determine a contact number associated with the number of user interactions by:
         querying a contact repository based on at least the number of user interactions; and
         receiving the contact number associated with the number of user interactions; and
      cause the wireless communication device to dial the contact number at an end of the user interaction time interval.

10. The wireless communication device of claim 9, wherein the processor is further configured to cause the wireless communication device to: initiate the user interaction time interval upon detecting a first user interaction of the plurality of user interactions.

11. The wireless communication device of claim 9, further comprising:
   a second sensor,
   wherein the processor is further configured to cause the wireless communication device to:
      detect a first user interaction of the plurality of user interactions from the first sensor within a disambiguation time interval;
      detect a second user interaction of the plurality of user interactions from the second sensor within the disambiguation time interval; and
      ignore one of the first user interaction or the second user interaction.

12. The wireless communication device of claim 9, wherein the first sensor is an accelerometer.

13. The wireless communication device of claim 9, wherein the contact repository comprises a plurality of contacts, wherein one or more of the plurality of contacts is associated with a unique number of user interactions, and wherein no contact of the plurality of contacts is associated with the same number of user interactions as any other contact of the plurality of contacts.

14. The wireless communication device of claim 9, wherein, in order to cause the wireless communication device to dial the contact number at an end of the user interaction time interval, the processor is further configured to cause the wireless communication device to:
  send the contact number to a phone application of the wireless communication device; and
  send an indication to the phone application to dial the contact number.

15. The wireless communication device of claim 9, wherein the wireless communication device is in a locked state during the user interaction time interval.

16. A non-transitory computer readable medium storing a program causing a wireless communication device to execute a method for initiating a call from a wireless communication device, the method comprising:
  receiving sensor data from a first sensor in the wireless communication device during a user interaction time interval;
  detecting a plurality of user interactions on the wireless communication device during the user interaction time interval based on the sensor data;
  for each respective user interaction of the plurality of user interactions:
    determining a magnitude of the respective user interaction; and
    incrementing a number of user interactions if the magnitude of the respective user interaction is greater than a threshold;
  determining a contact number associated with the number of user interactions by:
    querying a contact repository based on at least the number of user interactions, and
    receiving the contact number associated with the number of user interactions; and
  causing the wireless communication device to dial the contact number at an end of the user interaction time interval.

17. The non-transitory computer readable medium of claim 16, the method further comprising: initiating the user interaction time interval upon detecting a first user interaction of the plurality of user interactions.

18. The non-transitory computer readable medium of claim 16, the method further comprising:
  detecting a first user interaction of the plurality of user interactions from the first sensor in the wireless communication device within a disambiguation time interval;
  detecting a second user interaction of the plurality of user interactions from a second sensor in the wireless communication device within the disambiguation time interval; and
  ignoring one of the first user interaction or the second user interaction.

19. The non-transitory computer readable medium of claim 16, wherein the first sensor in the wireless communication device is an accelerometer.

20. The non-transitory computer readable medium of claim 16, wherein causing the wireless communication device to dial the contact number at an end of the user interaction time interval comprises:
  sending the contact number to a phone application of the wireless communication device; and
  sending an indication to the phone application to dial the contact number.

* * * * *